Figure 4:
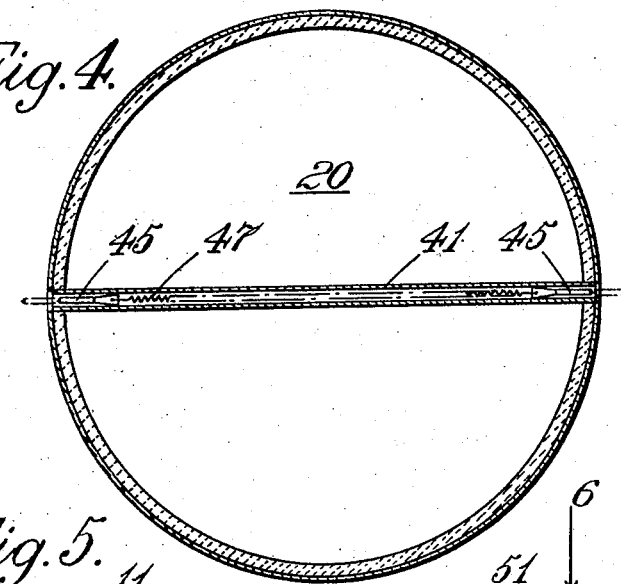

Sept. 27, 1960     H. J. POLLARD ET AL     2,954,189
AIRCRAFT FUSELAGE
Filed April 13, 1953                                       4 Sheets-Sheet 1
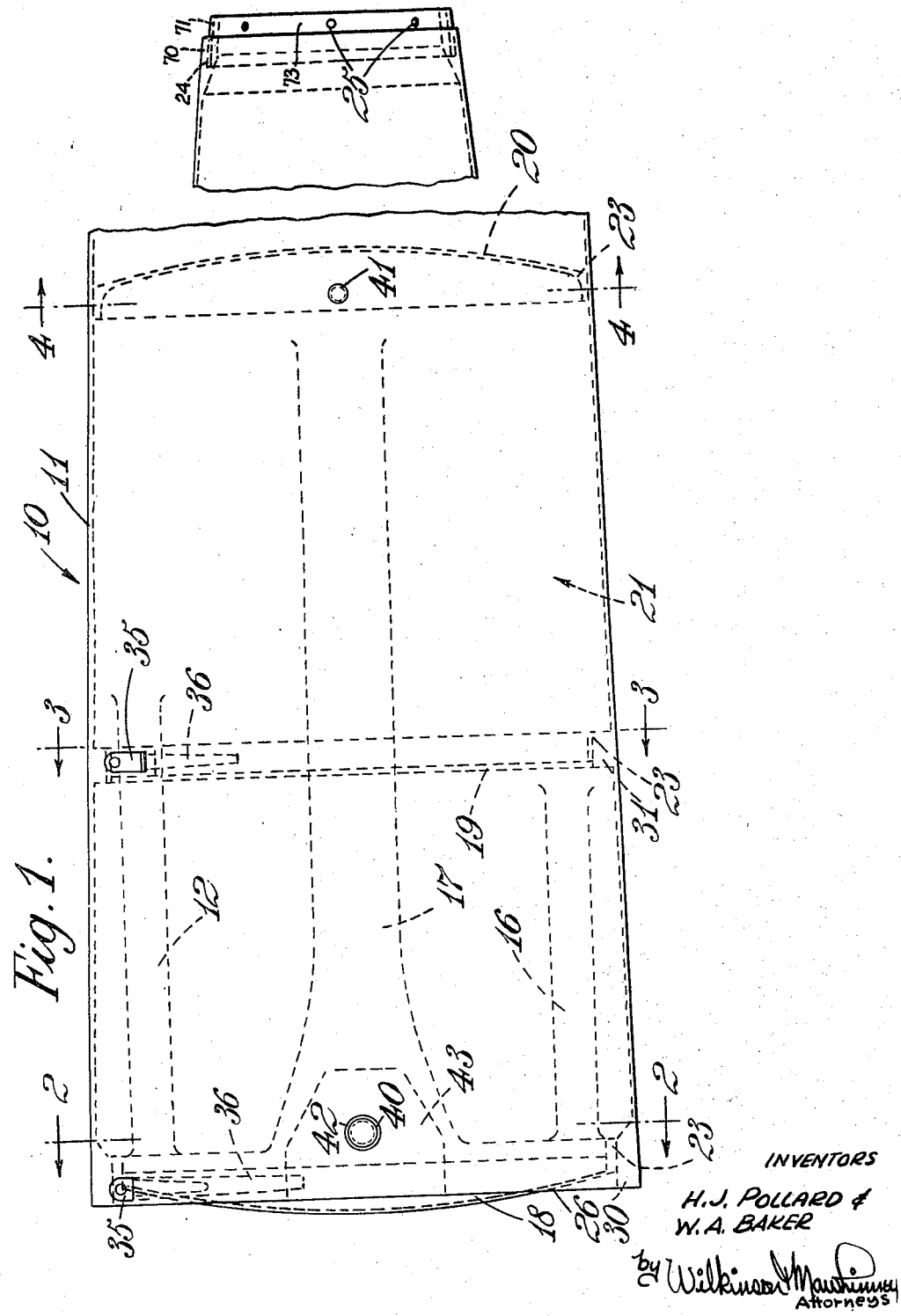
INVENTORS
H.J. POLLARD &
W.A. BAKER
by Wilkinson Mawhinney
Attorneys Sept. 27, 1960     H. J. POLLARD ET AL     2,954,189
AIRCRAFT FUSELAGE
Filed April 13, 1953                                             4 Sheets-Sheet 2
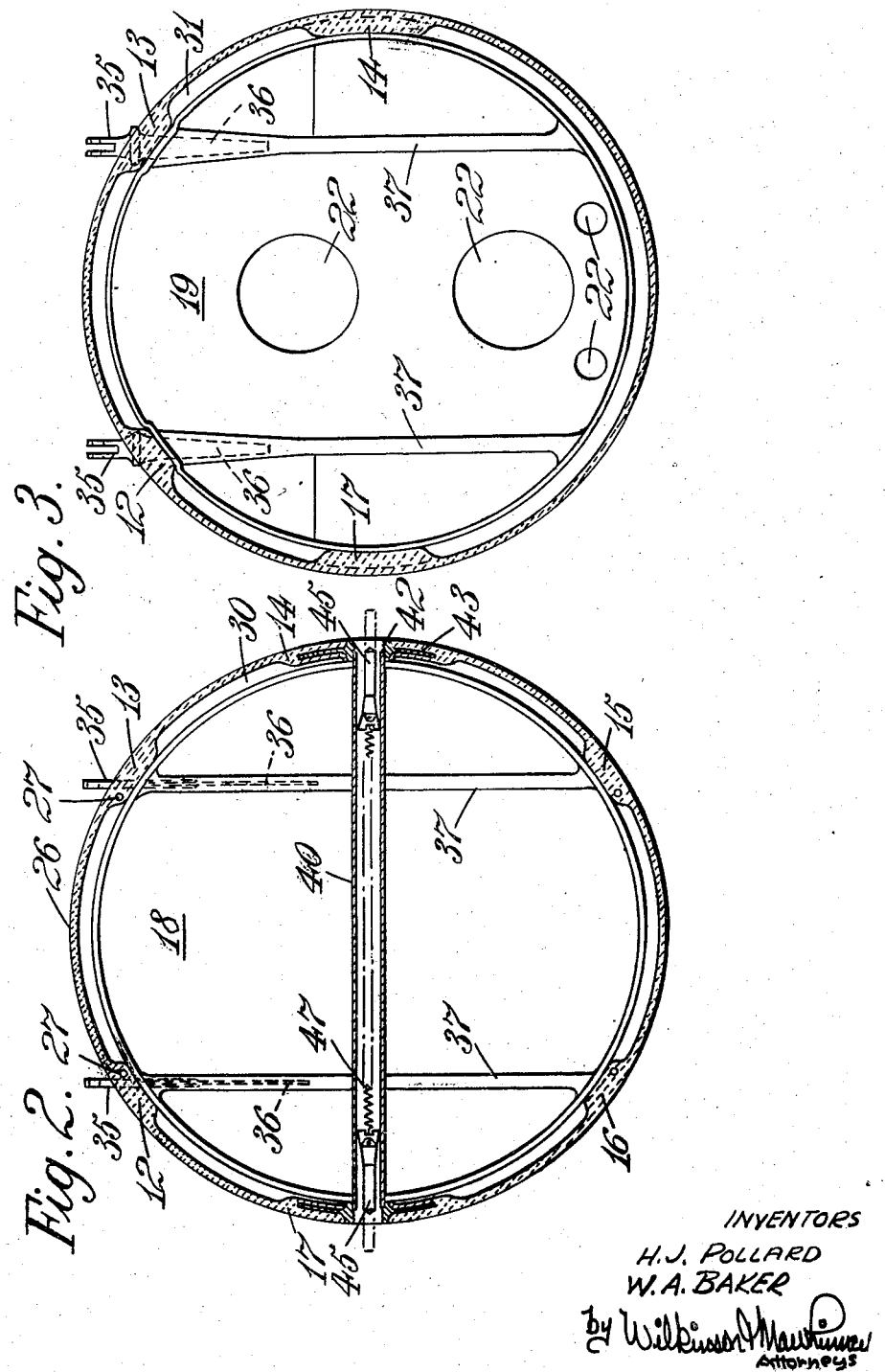
INVENTORS
H.J. POLLARD
W.A. BAKER
by Wilkinson Mawhinney
Attorneys Sept. 27, 1960     H. J. POLLARD ET AL     2,954,189
AIRCRAFT FUSELAGE Filed April 13, 1953     4 Sheets-Sheet 3

INVENTORS
H. J. POLLARD &
W. A. BAKER

Sept. 27, 1960  H. J. POLLARD ET AL  2,954,189
AIRCRAFT FUSELAGE

Filed April 13, 1953  4 Sheets-Sheet 4

INVENTORS
H.J. POLLARD &
W.A. BAKER
by Wilkinson...
Attorneys

United States Patent Office 2,954,189
Patented Sept. 27, 1960

2,954,189

AIRCRAFT FUSELAGE

Harold John Pollard and William Andrew Baker, Bristol, England, assignors, by mesne assignments, to Bristol Aircraft Limited, Bristol, England, a British company Filed Apr. 13, 1953, Ser. No. 348,271

Claims priority, application Great Britain Apr. 17, 1952

7 Claims. (Cl. 244—119)

This invention concerns aircraft fuselages and fuselage-like structures, and relates more particularly to fuselages for guided missiles, that is, power driven aerodynes deriving their lift from aerofoils and carrying a war head, the missile being remote controlled as to flight by a guidance system acting through flight control surfaces, for example, ailerons, rudders, variable incidence wings and so on. The invention may also be applied to fuselage-like structures however, such as auxiliary drop-fuel tanks.

According to the present invention a fuselage, fuselage sub-assemblage or a fuselage-like structure such as a component for an aircraft drop fuel tank comprises a one-piece moulding bonded with synthetic resin having a tubular skin of generally circular or elliptic cross-section, and strengthening and stiffening members moulded integrally with said skin.

According to a feature of the present invention said tubular moulding may contain at least two axially spaced diaphragms, each comprising a moulding bonded with synthetic resin in which case said diaphragms are a close fit within the tubular moulding and adhesively united thereto around their peripheral edges, and preferably the diaphragms close off at least a part of the tubular moulding so that said part may serve as a fuel tank for an engine of the aircraft of which the fuselage, fuselage sub-assemblage or the like is to form a part.

According to another feature of the present invention one or more of the diaphragms may be adapted to receive means for attaching fixed wings to the fuselage or fuselage sub-assemblage, the diaphragms receiving said wing attachment means being formed with strengthening members to enable them to carry the wing loads, and it is preferred that three diaphragms are provided, the intermediate diaphragm and one of the other diaphragms being adapted to receive wing attachment means, said other diaphragm and the third diaphragm being tank-end diaphragms, and the intermediate diaphragm being provided with one or more holes for the passage of fuel.

In an alternative arrangement, according to another feature of the present invention, said tubular moulding carries attachment means for the stub-shafts of a pair of variable incidence wings and said attachment means is rotatable by actuator means to adjust the incidence of said variable incidence wings.

Figure 5:
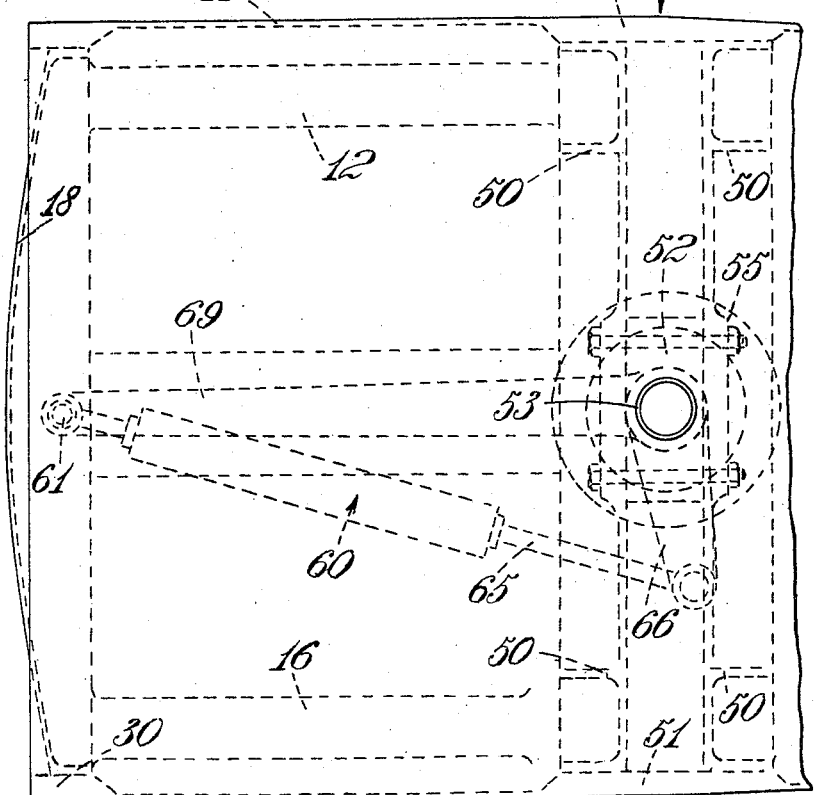
Figure 6:
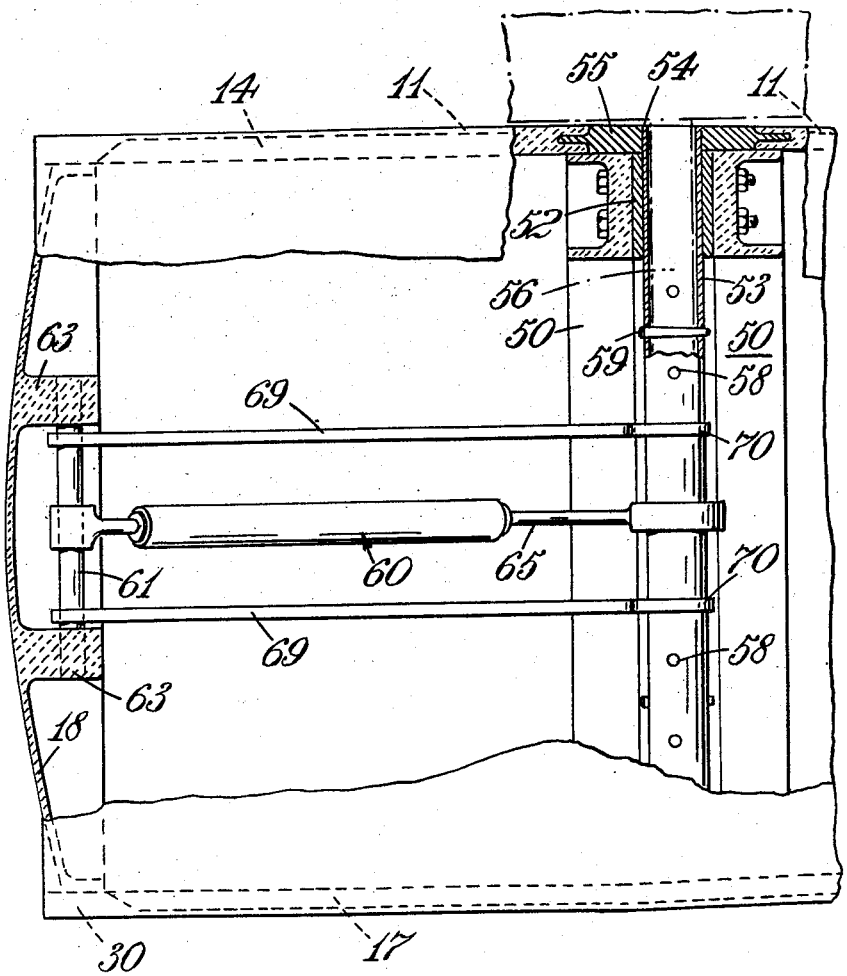

Two embodiments of the present invention will now be described by way of example with reference to the accompanying drawings whereof:

Figure 1 is a side elevation of a guided missile fuselage subassemblage in accordance with the present invention having attachment means for a pair of fixed wings, Figure 2 is a cross-section on line 2—2 of Figure 1, Figure 3 is a cross-section on line 3—3 of Figure 1, Figure 4 is a cross-section on line 4—4 of Figure 1, Figure 5 is a partial side elevation showing a modification of the guided missile fuselage sub-assemblage of Figure 1 the modification including attachment and actuator means for a pair of variable incidence wings as opposed to a pair of fixed wings, and Figure 6 is a partially sectional view of Figure 5 in the direction of arrow 6; part of the fuselage skin being broken away to show certain constructional details of the attachment and actuator means.

Referring to Figures 1 to 4 of the drawings, the guided missile fuselage sub-assemblage comprises a one-piece synthetic resin moulding generally indicated at 10. The moulding is frusto-conical in shape and has a skin 11, and six strengthening and stiffening members or longerons, 12, 13, 14, 15, 16 and 17, extending along the moulding and formed integrally with the skin 11 on the internal face thereof. The longerons are equi-spaced around the inside of the moulding, the left-hand pair, 12, 16 in Figure 2 and the right-hand pair 13, 15 in Figure 2 being also equi-spaced one on each side of the vertical plane passing through the long-axis of the moulding 10, and the longerons 14 and 17 lying in the horizontal diametral plane of the moulding 10, and being diametrically opposed.

The moulding 10 contains three axially spaced diaphragms 18, 19 and 20, the diaphragm 18 being positioned at the forward or larger diameter end of the moulding and forming with the diaphragm 20 and the skin 11 a closed space, or fuel tank, 21 within the moulding 10. The diaphragm 19 is positioned intermediately of the diaphragms 18 and 20 and is formed with holes 22 (see Figure 3) to allow the ready passage of fuel.

The diaphragms 18, 19, 20 are each separately moulded from synthetic resin impregnated material and are each dished, being provided with a peripheral flange 23 extending longitudinally of the moulding 10 on one side of the diaphragm. The diaphragms are each a close fit within the moulding 10 and the diaphragms 18 and 20 are curved, their concave sides facing one another, while the diaphragm 19 is flat. The diaphragms are adhesively united to the moulding 10, the diaphragms 18 and 19 to thickened ring portions 30, 31 of the skin 11 and the diaphragm 20 directly to the skin.

The moulding 10 is intended as a forward subassemblage of a fuselage, and is adapted, as hereinafter described, to carry a pair of fixed wings. The moulding 10 is also adapted for attachment to a rear fuselage subassemblage which may carry a tail plane and fin.

In order that the moulding 10 may be attached to a rear fuselage sub-assemblage, it has at its rear end (the right hand end in Figure 1), an integrally moulded thickened ring portion 70 which constitutes a stiffening or strengthening member extending circumferentially around the interior of the skin 11, and the thickened ring portion has a circumferential step 71 to provide an overlapping joint with the rear fuselage sub assemblage. In the example being described, the rear fuselage sub assemblage is to be bolted to the moulding 10, and the step 71 is provided with bolt holes 25. Since the moulded material is not sufficiently strong to withstand the bearing pressure of the bolts, however, a metal ring reinforcement 24 is moulded into the thickened ring portion 70, and the ring 24 has a portion having an exposed surface 73, the portion of the ring overlying and facing the step 71 in the thickened ring portion and having bolt holes aligning with the bolt holes in the step 71. As may be seen from Figure 1, the step to form the overlapping joint with the rear fuselage sub assemblage is spaced inwardly from the outer surface of the skin 11 and is outwardly directed. The step is arranged to receive in overlapping relation an inwardly directed step on the rear fuselage sub assemblage, which step has an exposed surface and is spaced inwardly from the outer surface of the skin of the rear fuselage sub assemblage so that the rear end of the moulding 10 may be entered into the rear fuselage sub assemblage with the outer surface of the skin 11 flush with the outer surface of the rear fuselage sub assemblage.

The fuselage as a whole is for a guided missile aircraft having a container such as a warhead secured to the forward end face 26 of the moulding 10. To this end, the longerons 12, 13, 15, 16 extend up to the end face 26 and holes 27 (see Figure 2) are provided in the longerons for the attachment of a suitable warhead.

As shown in Figure 1, the upper pair of longerons 12, 13 extend from the front end face 26 to beyond the diaphragm 19, and these longerons may receive two pairs of transversely spaced steel wing attachment lugs 35 each of which passes through the skin 11 and one of the longerons 12 or 13 and is anchored in a steel insert 36 moulded into a rib 37 formed integrally with either the diaphragm 18 or the diaphragm 19 within the dished portion thereof, the ribs 37 (see Figures 2 and 3) on each diaphragm being parallel, vertically disposed, and equi-spaced one on each side of the vertical centre line of the diaphragm, and strengthening the diaphragm to enable it to carry the portion of the wing loads.

For launching, the launching loads are applied to the side longerons 14, 17. To this end two horizontal diametrically arranged tubes 40, 41 having their ends flush with the outer face of the skin 11 pass across the moulding 10 adjacent to the diaphragms 18 and 20, the ends of the tube 40 being mounted in bosses 42 formed in steel plates 43 moulded into the longerons 14 and 17. Each tube 40, 41 houses a pair of self retracting pins 45 (see Figures 2 and 4) slidable in the tube and connected together by a coiled tension spring 47, and the launching forces are applied to these pins the pins then being in an extended position as shown chain dotted in Figures 2 and 4.

Referring to Figures 5 and 6 of the drawings, in a modified arrangement, the diaphragm 19 is replaced by two circular axially spaced diaphragms in the form of channel sectioned frames 50 mounted within the moulding 10. The frames are a close fit within the moulding, and are received by a thickened ring portion 51 of its skin 11. Bolted between the frames 50 at each end of a horizontal diametral line is a journal or block bearing 52. The bearings 52 receive the ends of a hollow sleeve 53 the end faces 54 of which lie flush with the outer surface of the skin 11 the shaft passing through the thickened ring portion 51 at each end. The portion 51 is locally reinforced to receive the sleeve by means of steel bearing plates 55 moulded in to the ring portion.

The sleeve 53 is adapted fixedly to receive the stub shafts 56 (see Figure 6) of a pair of variable incidence wings, and is provided with holes 58 for cotter pins 59 to lock the stub shafts to the sleeve.

The sleeve 53 is rotatable to adjust the incidence of the variable incidence wings by actuator means which will now be described.

The actuator means comprises a hydraulic jack generally indicated at 60, the cylinder of which is carried by a fixed horizontal pivot shaft 61 in turn carried between a pair of spaced parallel vertical ribs 63 moulded integrally with the diaphragm 18. The jack cylinder is hingedly carried by the shaft 61 so that it is capable of swinging movement about the axis of the shaft.

The connecting rod 65 from the jack piston is connected to the free end of a lever arm 66 (see Figure 5) fixed to the sleeve 53 centrally thereof, so that movement of the jack piston rotates the sleeve 53 to adjust the angle of incidence of the variable incidence wings. Hydraulic fluid is supplied to the jack 60 under the control of the guidance system of the missile.

In order, additionally to support the sleeve 53, a pair of metal straps 69 are provided connected between the sleeve 53 and the shaft 61. The straps 69 are fixedly secured to the shaft 61, and carry bearings 70 at their other ends, in which are received the sleeve 53.

The fuselage structures described are made from felts comprising about equal parts by weight of asbestos fibre and phenolformaldehyde resin, the felts being about .085" thick. The felts which have been cut to size are moulded at a suitable pressure, which may be about 100 lbs. per square inch, the pressure being applied to the felts by an inflatable rubber bag which compresses the felts against a die face. The moulding pressure is applied while the felts are subjected to a temperature of about 140° C.

It is to be understood that the terms "horizontal" and "vertical" as used in the foregoing paragraphs and in the ensuing claims relate to the structure when in a position such as it would assume when forming part of an aircraft in level flight.

We claim:

1. In an aerial vehicle a hollow structure at least mainly composed of resin bonded fibre, said structure having an outer surface constituting part at least of the outer surface of the vehicle and comprising a one piece tubular skin moulding the external surface of which is smoothly and continuously curved in cross sections and is of smoothly continuous shape in longitudinal sections, said skin moulding comprising integral internally projecting stiffening members, said structure also comprising three diaphragm mouldings fitting closely in said skin moulding at axially spaced positions therein, adhesive securing said diaphragm mouldings to said skin moulding in said positions for each of said diaphragm mouldings, a load transmitting means carried by at least the intermediate diaphragm moulding and extending to the exterior of said skin moulding, the other diaphragm mouldings closing off at least a part of said skin moulding to form a fuel container and attaching means on said load transmitting means for attaching the structure to external supporting means.

2. In an aerial vehicle as claimed in claim 1, further comprising a thickened ring portion extending circumferentially around the interior of the skin moulding at one end thereof, a metal ring reinforcement arranged coaxially with, and moulded into said thickened ring portion, said reinforcement having an exposed surface forming a circumferential step spaced radially inwardly from the outer surface of said skin moulding.

3. In an aerial vehicle as claimed in claim 2, wherein said thickened ring portion has a circumferential step underlying and facing the step of said reinforcement.

4. In an aerial vehicle as claimed in claim 1 further comprising a metallic attachment means for the attachment of each of a pair of variable incidence wings to the structure, said intermediate diaphragm moulding comprising two diaphragm moulding members, said metallic attachment means rotatably carried from said two intermediate diaphragm moulding members and extending to the outside of said skin moulding, and actuating means carried from said skin moulding for rotating said attachment means to adjust the incidence of said wings.

5. In an aerial vehicle in combination, as claimed in claim 4, wherein said variable incidence wing attachment means together comprise a hollow horizontal diametrically disposed sleeve, the end faces of the sleeve lying flush with the outer surface of said skin moulding, and a pair of variable incidence wings each having a stub shaft fixedly received one in each end of said sleeve.

6. A combination of claim 5, wherein the ends of said sleeve are carried in journal bearings supported between said two diaphragm moulding members.

7. A combination of claim 6, wherein said actuator means comprises a hydraulic jack connected between one of said other diaphragm mouldings and a lever arm carried by said sleeve.

(References on following page)

References Cited in the file of this patent

UNITED STATES PATENTS

| | | |
|---|---|---|
| Re. 21,850 | Thomson | July 1, 1941 |
| 1,400,078 | Kempton | Dec. 13, 1921 |
| 1,552,112 | Clark | Sept. 1, 1925 |
| 1,996,281 | Dolan | Apr. 2, 1935 |
| 2,041,450 | Adams | May 19, 1936 |
| 2,355,084 | Kurrle | Aug. 8, 1944 |
| 2,365,080 | Humphreys | Dec. 12, 1944 |
| 2,394,259 | Perrine | Feb. 5, 1946 |
| 2,420,488 | Marhoefer et al. | May 13, 1947 |
| 2,618,448 | Robert | Nov. 18, 1952 |
| 2,690,314 | Porter et al. | Sept. 28, 1954 |

FOREIGN PATENTS

| | | |
|---|---|---|
| 953,618 | France | May 23, 1949 |